United States Patent [19]

Föhl

[11] 4,378,915
[45] Apr. 5, 1983

[54] BRAKING DEVICE FOR SAFETY BELTS
[75] Inventor: Artur Föhl, Schorndorf, Fed. Rep. of Germany
[73] Assignee: Repa Feinstanzwerk GmbH, Alfdorf, Fed. Rep. of Germany
[21] Appl. No.: 214,758
[22] Filed: Dec. 9, 1980
[30] Foreign Application Priority Data
 Dec. 14, 1979 [DE] Fed. Rep. of Germany ....... 2950443
[51] Int. Cl.³ .................... A62B 35/02; B65H 75/48
[52] U.S. Cl. ................... 242/107.2; 280/806; 297/478
[58] Field of Search ............ 242/107.2, 107.4 R, 242/107.4 E; 280/803, 806–808; 297/478, 480, 479; 188/65.1–65.5

[56] References Cited
U.S. PATENT DOCUMENTS 3,467,337 9/1969 Putman .................. 242/107.2 X
3,817,473 6/1974 Board et al. .............. 242/107.2
4,208,770 6/1980 Takada .................. 242/107.2 X
4,249,708 2/1981 Asano .................. 242/107.2
4,323,204 4/1982 Takada .................. 242/107.2

Primary Examiner—John M. Jillions
Attorney, Agent, or Firm—Herbert L. Lerner; Laurence A. Greenberg

[57] ABSTRACT

Braking device for safety belts which have a braking system ahead of the braking device, which latter has movable brake roller partly wrapped around by the belt, a stationary clamping bar disposed adjacent one side of the belt, and a movable arresting element. Upon activation resulting from a belt pull which exceeds a predetermined force, the brake roller is moved out of position against the arresting element which latter moves toward the stationary pad to cause clamping of the belt and which also arrest the brake roller by contact therewith.

12 Claims, 12 Drawing Figures

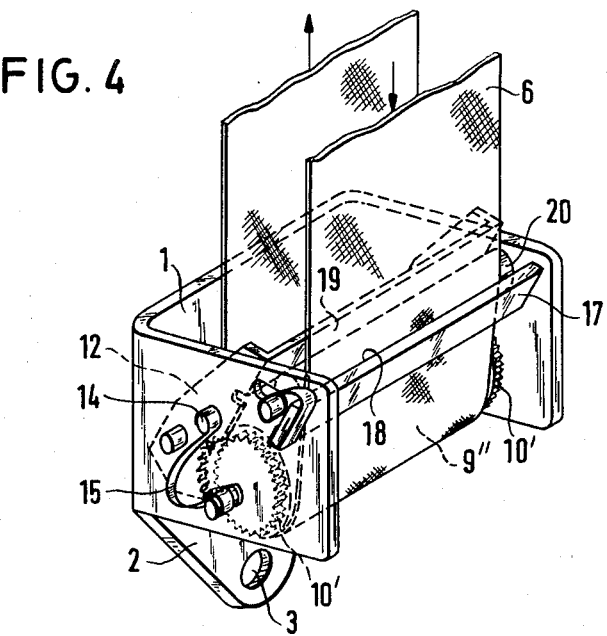
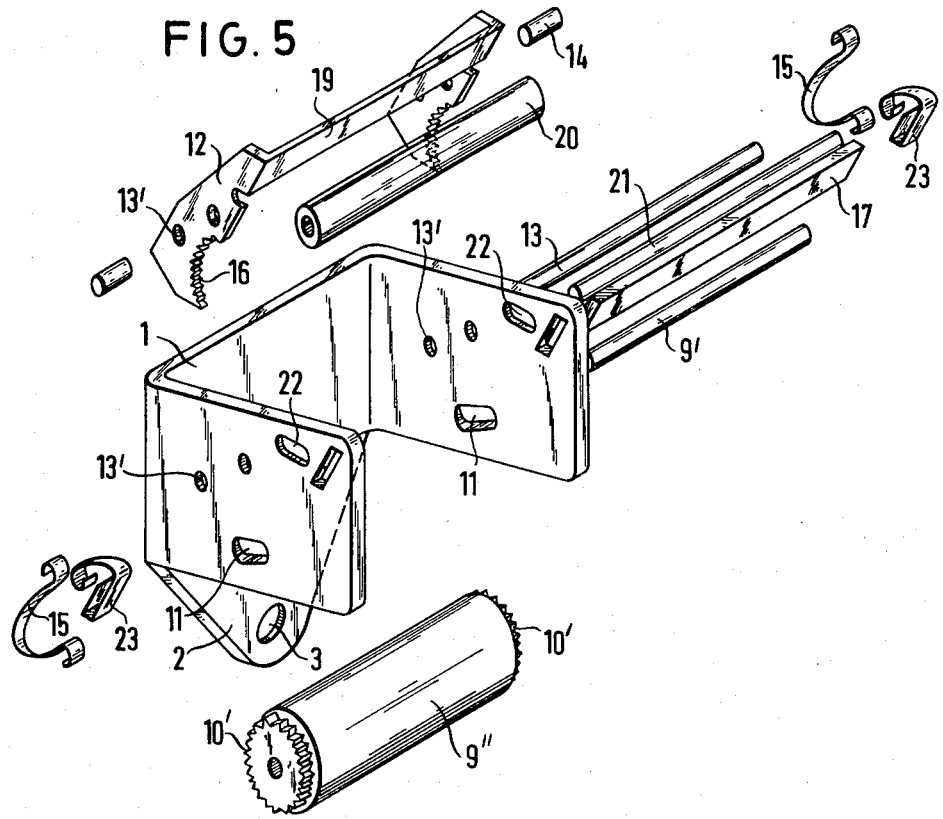

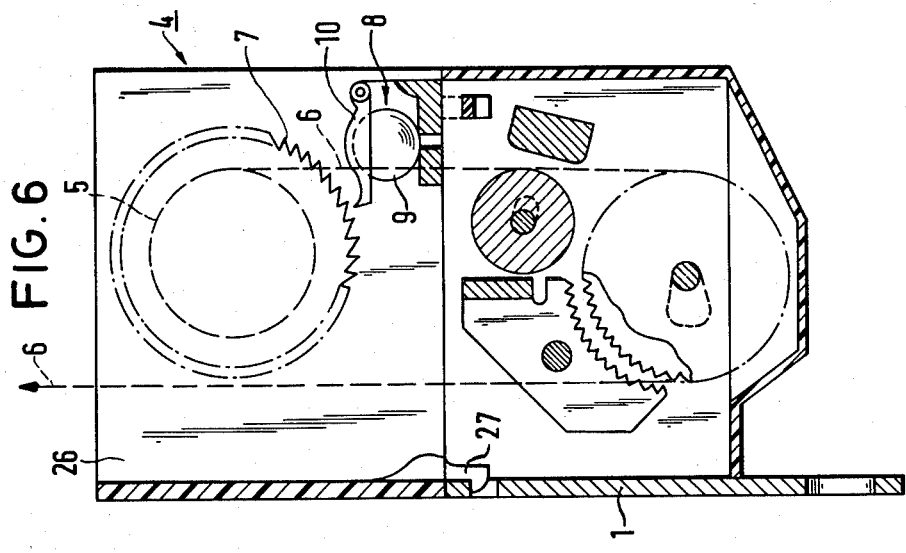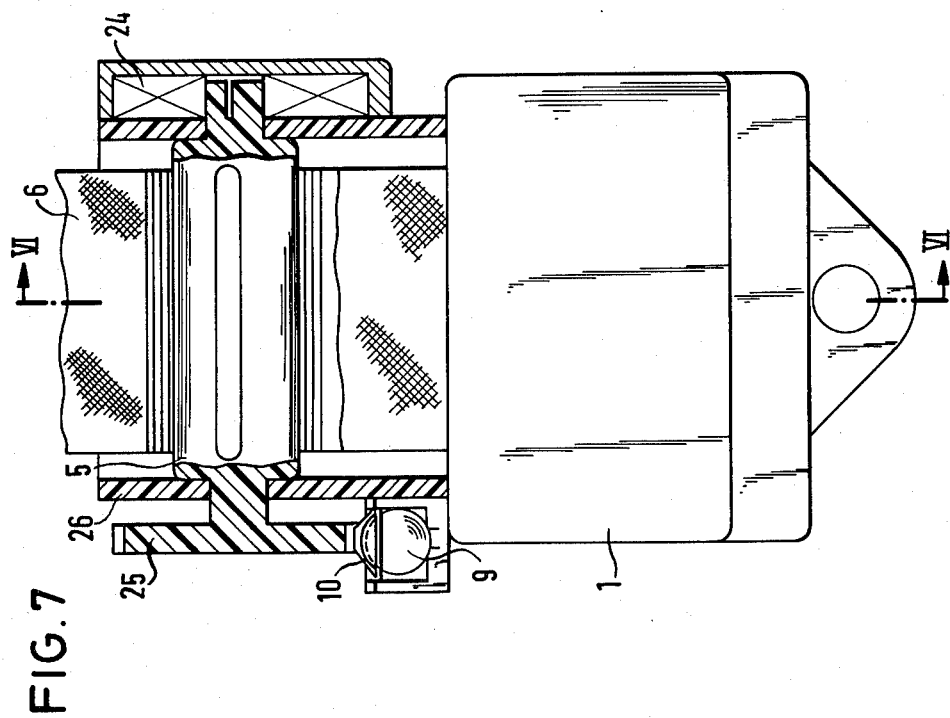

BRAKING DEVICE FOR SAFETY BELTS

BACKGROUND OF THE INVENTION

1. Field of the Invention

The invention relates to a braking device for safety belts, especially safety belts for motor vehicles, which have a locking device arranged ahead of it, and in which a belt brake becomes activated by the belt pull.

2. Description of the Prior Art

In safety belt systems, after the locking of the belt in an automatic roll-up device, there are approximately 50 to 100 mm of belt band which can still be pulled out from the belt portion rolled up in the automatic roll-up device, due to a film-spool effect at the roller. By sequentially arranging a holding device which arrests the belt after a short path, that is, almost immediately, this undesired film-spool effect is avoided.

There are devices known (GB No. 1,416,517) provided with such belt braking provisions, in which, when the belt brake is activated, the belt band is mechanically pressed between suitably shaped clamping jaws and thereby prevented from being pulled out any further. During this clamping, the fabric of the belt is strongly squeezed in small local areas and thereby damaged, so that the belt is unable with the required safety factor to accept the forces imposed by a crash. This unreliability factor is further aggravated by the fact that this clamping action occurs not only at an accident, but also during sharp braking when the belt brake is activated and moves into the clamping position. Severe damage to the belt results from the repeated clamping actions during its normal lifetime. The danger exists under these conditions that the belt will break in the case of an accident, a fact proven by suitable experiments. Therefore, in practice, these known belt-braking devices were not used.

Furthermore, braking devices for safety belts have been disclosed (for example, German Published Non-Prosecuted Application No. 19 49 061), wherein an energy-absorbing element is so constructed that a non-stretch belt is conducted around several shafts or rollers with a smooth surface, so that high friction forces are created, but the belt web is not damaged. In this manner, one obtains a certain degree of braking; however, this method cannot effect the complete blocking of the belt-roll-off. For this purpose, a great number of rollers would have to be arranged in series, and this would result in an unacceptable size and height of the device, and also causes deterioration of the belt due to the wear caused by the multiple deflections.

SUMMARY OF THE INVENTION

An object of the invention is to provide a braking device for a safety belt which will be without damaging influences on the belt web, is of simple construction, effects safe braking, and blocking of the belt is effected at a predetermined pull of the belt.

With the foregoing and other objects in view, there is provided in accordance with the invention a braking device for safety belts, especially safety belts for motor vehicles, which have a locking system ahead of the braking device, comprising a bracket, a movable brake roller partly wrapped around by the belt rotatably supported in the bracket, means sufficient to retain said brake roller in position during normal operation but insufficient to prevent movement of the brake roller out of position when activated by a belt pull which exceeds a predetermined force, a stationary clamping bar disposed adjacent one side of the belt near said brake roller, a movable arresting element having one portion near said movable brake roller and another portion disposed on the side of the belt opposite the side on which said stationary clamping bar is disposed to, upon activation of a belt pull in excess of said predetermined force movement of said brake roller out of its normal position and against said arresting element which latter moves toward the stationary clamping bar, causes clamping of the belt and which also arrests the brake roller by contact therewith.

Other features which are considered as characteristic for the invention are set forth in the appended claims.

Although the invention is illustrated and described herein as embodied in a braking device for safety belts, it is nevertheless not intended to be limited to the details shown, since various modification may be made therein without departing from the spirit of the invention and within the scope and range of equivalents of the claims.

BRIEF DESCRIPTION OF THE DRAWINGS

The invention, however together with additional objects and advantages thereof will be best understood from the following description when read in connection with the accompanying drawings, in which:

FIG. 4 is a perspective representation of the braking device for safety belts, according to the preceding figures;

FIG. 5 is an exploded view of the braking device for safety belts according to FIGS. 1-4;

FIG. 6 is a side view of a braking device according to the invention forming a structural unit together with an automatic locking device;

FIG. 7 is a plan view of the device according to FIG. 6; and

DETAILED DESCRIPTION OF THE INVENTION

Figure 1:
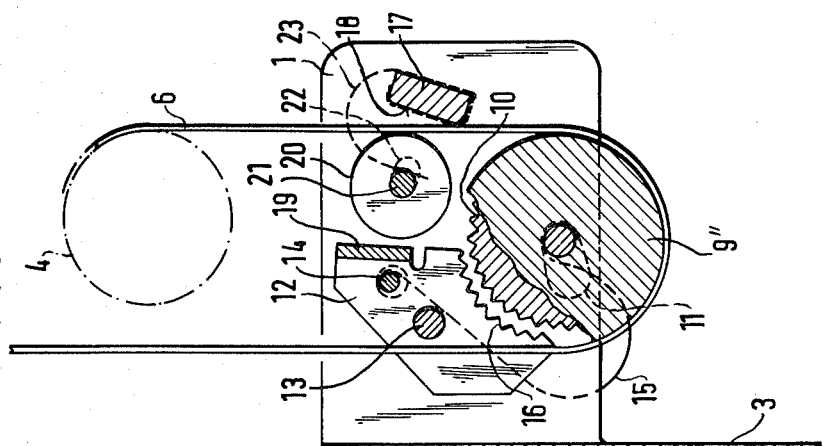
FIG. 1 is a side view in partial cross section diagrammatically illustrating the braking device for safety belts of the invention in the normal operating position. In particular are shown the relationship of a movable brake roller, a pivotally mounted rocker arm, a pressure pad, and a clamping roller and clamping bar to clamp the belt.
Figure 2:
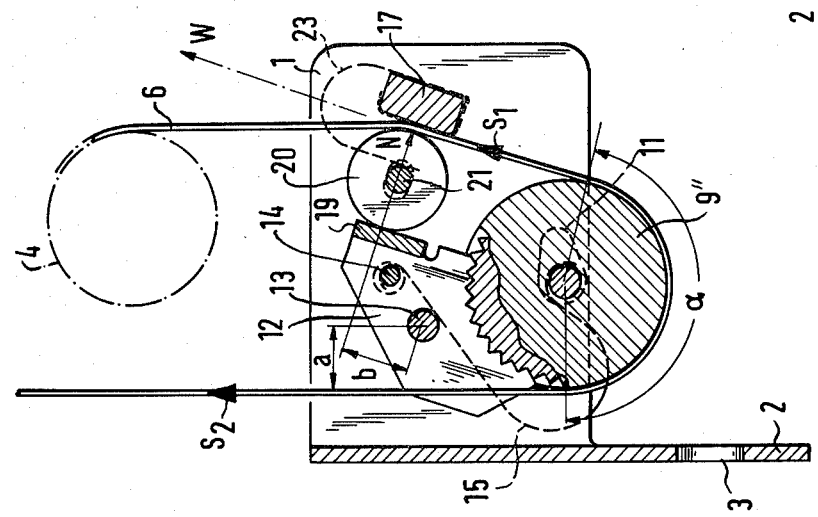
FIG. 2 shows braking device for a safety belt according to FIG. 1 in the activated state.
Figure 3:
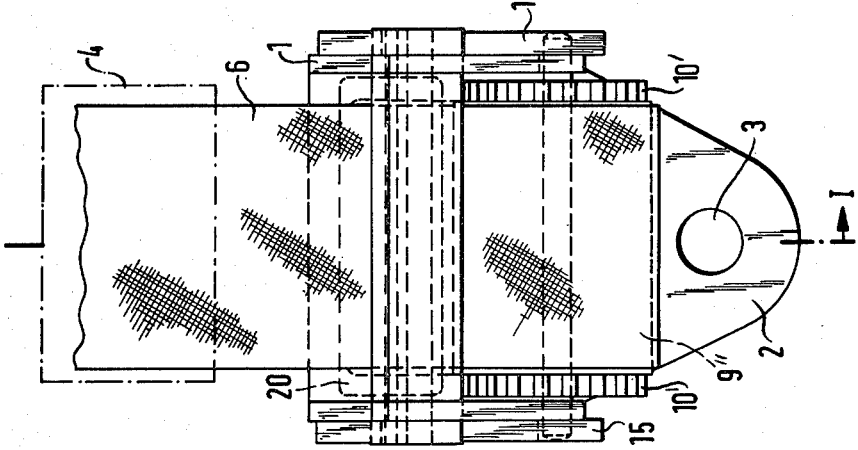
FIG. 3 is a plan view of the device according to FIGS. 1 and 2.

In accordance with the invention an arresting element is provided against which the roller can be moved and arrested when activated, and which arresting element can be moved into a locking position against a stationary bar, and a belt portion which is in front of the clamping bar thereby becomes securely locked. According to a preferred embodiment, the braking friction between the roll surface of the arresting roller and the belt is great enough so that a force moment is transferred to the arresting element which is sufficient to clamp the belt, directly or indirectly by means of the arresting element without slippage.

In particular, the system according to the invention is made to utilize the so-called band-brake effect. This band-brake effect, i.e. the force moment acting on the arresting element, is used to operate a clamping brake which is arranged before the band brake. By the combination of those two braking effects, only a fraction of the clamping force is required at the clamp-point than would be required without the band brake. The combination results in complete blocking of the belt at activation, i.e. in the case of a crash, and the construction can be very simple and economical. Based on the combined actions of the mentioned braking effects, only a single brake roller is required. The application of the safety belt device according to the invention for safety belt systems in motor vehicles with a preceding locking system results in the advantage that the locking system, i.e. the automatic locking- or wind-up device can be manufactured, very simply, economically and with a light construction, because the total pull-forces no longer act on this automatic locking device.

Obviously, the braking device for safety belts is applicable for all types of belt-pull systems, such as the mentioned safety belt systems in motor vehicles, but also for other pulling devices, such as lifting devices, devices to prevent falling and the like. According to a further development of the invention, the arresting element is constructed in the form of a two-armed rocker arm, and hingeably supported against a spring force. One arm is provided with the arresting means which work in conjunction with the roller, preferably having arresting teeth, and at the other arm of the rocker has a pressure pad which presses directly or indirectly onto the clamping bar. The arresting element can directly clamp the belt with its pressure pad against the clamping bar, or there may be provided intermediate parts, for example, freely rotatable rollers, which are pressed by the arresting element against the clamping bar when activated.

In a preferred embodiment, the belt can be form-fittingly clamped at the clamping bar, whereby an additional band-braking effect is obtained. Further advantageous embodiments of the invention will be explained and described in the following with the aid of typical embodiments.

In the typical embodiments according to FIGS. 1-5, a U-shaped bracket 1 is provided as the supporting element for the parts of the braking device for safety belts described in the following. The bracket comprises a fastening lug 2 having a fastening opening 3, through which the described device can be attached, for example, to the frame of a motor vehicle. In the FIGS. 1-3, an automatic roll-up device 4, a known device, is indicated by dot-dash lines, which has, as shown in FIG. 6, a winding axle 5 for a belt 6. This winding axle is provided with locking-teeth 7 which work in conjuction with a mechanical release system for example, an inertial mass system 8 with a ball-mass 9 and a locking pawl 10 in such a manner that, at the occurrence of predetermined accelerating forces, for example, in the case of a crash, the ball-mass 9 is displaced and the locking pawl 10 engages the locking teeth 7, and prevents further roll-off of the belt. However, due to the known film-spool effect, to a certain extent also after locking of the winding axle 5, further rolling of the belt takes place, for example, a length of 50 to 100 mm, a fact that greatly reduces the safety function of the safety belt. To avoid this disadvantage, the braking device described in the following is arranged sequentially after the automatic locking device 4, which has the purpose of preventing the further roll-off of the belt 6.

The braking device for the safety belt according to FIGS. 1-5 consists of a roller 9" with a smooth, non-skid surface, which is provided with locking teeth 10' at both sides of the smooth roll-off surface. The roller 9" with the locking teeth 10' is slideably supported in elongated holes 11 of the bracket 1. In the immediate vicinity of the roller 9", a metallic rocker arm 12 is hingeably supported at the bracket 1 on axle 13, which is guided in the support openings 13' of the rocker-arm 12 and the bracket 1. A stop pin 14 limits the motion of the rocker arm 12. Springs 15 are provided at the stop pin 14. The springs butt against the axle of the roller 9" and press the latter into the normal rest position, according to FIG. 1, where the locking-teeth 10' of the roller 9" are spaced away from the locking teeth 16 of the arresting means 12 (rocker-arm), which is shaped as a circular segment. A clamping-bar 17 is stationary and fixedly supported in a slightly oblique position between the U-shaped legs of the bracket 1. A clamping roller 20 is arranged between the clamping surface 18 and the pressure pad 19 of the arresting means 12 which are constructed as a two-armed rocker-arm. The support shaft 21 of the clamping roller 20 is slideably supported in slots 22 of the bracket 1. This clamping-roller 20 is held by a form-spring 23 in its normal position, in which the surface of the roller is spaced from the clamping surface 18 of the clamping bar 17.

The belt 6, which comes from the automatic locking device 4, wraps around the surface of the roller 9", which is so made that a high friction value (force) is generated between the belt 6 and the surface of the roller. The clamping bar 17 is disposed at the side of the guided path of the belt 6, which glides over its rounded corners easily, or is spaced away from it. In the shown embodiment, the clamping roller 20 lightly touches the belt 6 and turns with it. When activated, i.e. at the occurrence of strong pulling forces at the belt 6, the release mechanism 8, according to FIG. 6, is activated, and the winding axle 5 is suddenly locked. Now, according to FIG. 2, the roller 9" is pressed by the pulling forces acting on the belt 6 with its locking teeth 10' into the locking teeth 16 of the arresting means 12, whereby the roller 9" is also locked. Obviously, instead of the locking teeth there can be also a friction surface provided for the locking of roller 9". The roller 9", on which the torque continues to act, now presses the arresting means 12 in the direction of the clamping bar 17, whereby the pressure pad 19 bears on the clamping roller 20, and the latter clamps the belt 6 with the clamping surface 18 of the clamping bar 17, and thereby blocks the belt. The clamping force increases with an increasing pull on the belt 6. After these events, there are no forces acting on the winding axle 5 of the automatic locking device 4; rather, these forces are absorbed by the above-explained braking device for the safety belt.

The process of locking can also be effected by a jerk-like pull-out of the belt, because the system, which is kept disengaged by spring means, becomes engaged due to the mass-inertia of the system, so that the locking system which precedes the braking device can be of a very simple and light construction.

In FIGS. 6 and 7, a safety belt system is shown wherein a braking device for a safety belt, as described in the preceding, is structurally combined with an automatic locking device 4. The braking device contains the previously described parts, whose functions and arrangements are not further explained. These parts are fastened at the bracket 1. It was also already explained that the automatic locking device 4 comprises a winding axle 5 and also a mechanical release mechanism 8. The winding axle 5, on the one hand, is acted upon by the pull-back force of a spring 24, and, on the other hand, is provided with a locking wheel 25, which the locking pawl 10 engages when activated. In the embodiment, the housing 26 of the automatic locking device 4 is in a fixed connection with the matching bracket 1 of the braking device, for example, by the detent latches 27, so that an integral structural unit is created. It was already mentioned, that because of the special braking action of the braking device for the belt, the automatic locking device can be of a light construction, because no forces are acting upon it in the case the system is activated. Simple plastic parts are sufficient to assure the function of this unit.

Figure 8:
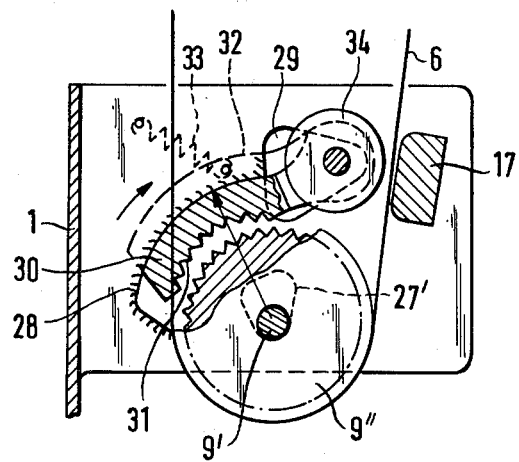
FIGS. 8-12 are five different embodiments of the braking device for safety belts according to the invention, shown in sectional views.

In the embodiment according to FIG. 8, there is also a roller 9" rotatably supported by a support shaft 9' at a bracket 1. Again, the support shaft 9' is arranged slideably in the direction of the arrow in an upwardly directed guide slot 27'. A stationary curved sector designated 28 ends into an expanded cut-out 29. An arresting element 30 is curved at one side to correspond to the curved sector, and at the other side is provided with locking- or arresting teeth 31, which work in conjunction with the locking- or arresting teeth of the roller 9" in the described manner. The arresting element 30 is kept in the non-operative position, shown in FIG. 8 by a spring 33 which is fastened to an adjoint piece 32 of the arresting element 30. A clamping roller 34 is connected with the arresting element 30, which roller is normally freely rotatable, and which is pressed by the motion of the arresting element 30 along the curved sector 28 in the direction of the arrow, against the clamping bar 17 for clamping the belt 6.

Figure 9:
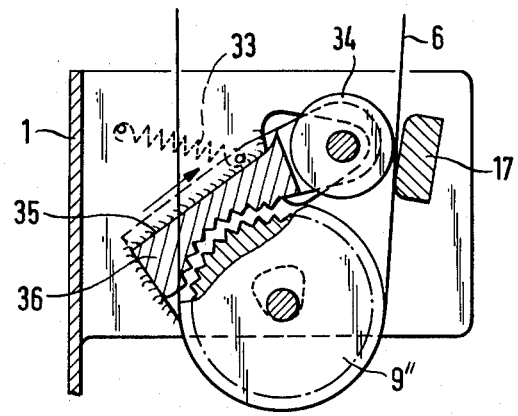

In the embodiment according to FIG. 9, a straight gliding path 35 is provided at the bracket 1, instead of the curved arc-shaped sector 28, on which the arresting element 36 can slide in the direction of the arrow toward the clamping bar 17 by the torque of the roller 9". The braking action, and the functional operation is also here the same as in the preceding embodiments.

Figure 10:
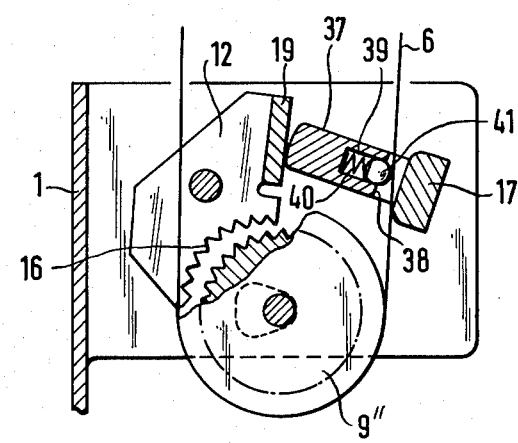

In the embodiment according to FIG. 10, the configuration of the roller 9" and of the arresting element 12 is the same as in the embodiment according to FIGS. 1-5, and therefore will not be explained further. Instead of the clamping roller 20 according to FIG. 1, in the embodiment according to FIG. 10 an intermediate part 37 is slideably supported at the bracket 1 between the pressure pad 19 and the clamping bar 17. The intermediate part 37 is provided with a clamping surface 38, which, after the device is activated presses onto the clamping bar 17 while pinching the belt 6. The intermediate part 37 is provided with a bore 39 in which a spring 40 is seated, which pushes a roller or ball beyond the clamping surface 38, whereby the ball 41 rests lightly on the belt in the non-operating position. When the device is activated, the ball 41 is pressed behind the clamping surface 38.

Figure 11:
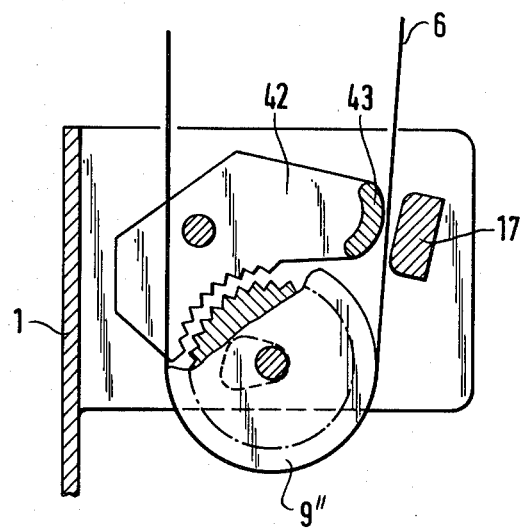

The embodiment according to FIG. 11 is similarly constructed to the embodiment according to FIGS. 1-5, only here an intermediate part or a clamping roller is missing, and instead the arresting member 42 works directly with a rounded pressure portion 43 in conjunction with the clamping bar 17 to clamp the belt 6.

Figure 12:
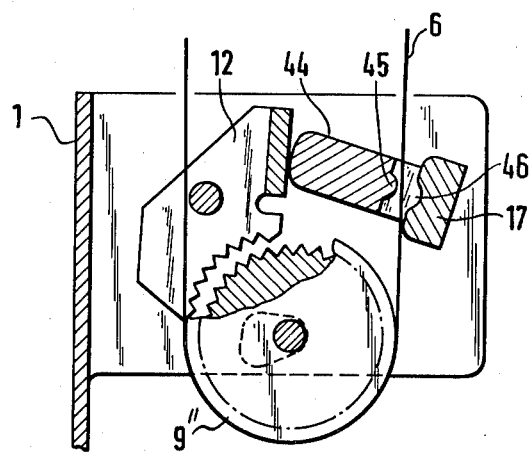

The embodiment according to FIG. 12 is in principle similarly constructed as the embodiment according to FIG. 10, and is provided with an intermediate part 44 which can be longitudinally displaced by the arresting means 12. The intermediate part 44 has a raised portion 45 which matches a clamping depression 46 which is machined into the clamping surface of the clamping bar 17, whereby the belt 6 can be form-fittingly clamped at the clamping bar 17.

In all embodiments, the braking device for the safety belt is so constructed that the braking friction between the roll surface of the arresting roller 9", i.e. after activation of the system, and the belt 6 is great enough so that a force moment is transferred to the arresting element, for example 12, which is sufficient to clamp the belt 6 directly or indirectly by means of the arresting element without slippage.

In related calculations, the generally known friction laws can be used, as explained in the following example. Hereby, reference is made to the embodiment according to FIG. 2;

In this example the pulling force $S_2$=counter force $S_1 \times e^{\mu \alpha}$, whereby $\mu$ is the friction coefficient of the friction pair between roller surface and belt 6, and $\alpha$ is the wrap-around angle of the belt 6. The friction value (force) can be determined from $\mu_1 N = S_1$, whereby $\mu_1$ is the friction coefficient of the clamping point.

For the limit case force $w = S_1 = \mu_1 \times N$ (clamping force) and by a force moment ratio $M = S_2 \times$ distance $a - S_1 \times$ distance b, the result for the minimum friction value is $\mu_1 \geqq S_1/N$.

I claim:

1. Braking device for safety belts, especially safety belts for motor vehicles, which have a locking system ahead of the braking device, comprising a bracket, a movable brake roller partly wrapped around by the belt rotatably supported in the bracket, means sufficient to retain said brake roller in position during normal operation but insufficient to prevent movement of said brake roller out of position when activated by a belt pull which exceeds a predetermined force, a stationary clamping bar disposed adjacent one side of the belt near said brake roller, a movable arresting element having one portion near said movable brake roller and another portion disposed on the side of the belt opposite the side on which said stationary clamping bar is disposed, said arresting element including means for arresting rotation of said brake roller when said arresting element and brake roller are in contact, whereby, upon activation of a belt pull in excess of said predetermined force movement of said brake roller out of its normal position and against said arresting element which latter moves toward the stationary clamping bar to cause clamping of the belt and which also arrests the brake roller by contact therewith, and wherein braking friction between the roll surface of said brake roller and said belt partly wrapped around said brake roller is great enough so that a force moment is transferred to said arresting element which is sufficient to clamp the belt by means of the arresting element without slippage.

2. Braking device for safety belts according to claim 1, wherein said arresting element is slideable on a straight path.

3. Braking device for safety belts according to claim 1, wherein a spring is attached to said arresting element to exert a spring force on said element, and wherein said arresting element is slideable on a path which is concentrically curved to the brake roller axis, against said spring force.

4. Braking device for a safety belt according to claim 1, wherein the belt is form-fittingly clamped at the clamping bar.

5. Braking device for safety belts according to claim 4, wherein the clamping bar is provided with a clamping depression, and wherein a pressure pad is disposed between the arresting element and the belt, and wherein the arresting element moves the pressure pad against the belt, which pressure pad is provided with a raised portion which matches the clamping depression.

6. Braking device for safety belts according to claim 1, where a freely rotatable clamping roller is disposed between the arresting element and the belt, and wherein said arresting element can press said freely rotatable clamping roller against the belt at the clamping bar to thereby clamp the belt.

7. Braking device for safety belts according to claim 1, wherein the brake roller, the arresting element and the clamping bar are supported in one bracket.

8. Braking device for safety belts according to claim 7, wherein said locking system ahead of the braking device is enclosed in a housing, and wherein said bracket is fixedly connected with said housing of said locking system ahead of the braking device.

9. Braking device for safety belts according to claim 8, further including an automatic retractor for automatically winding up the safety belt, said retractor being enclosed in said housing, and wherein said locking system includes a ball mass for sensing acceleration or deceleration of the vehicle and means responsive to said ball mass sensing a predetermined acceleration or deceleration of the vehicle for locking rotation of the retractor.

10. Braking device for safety belts, especially safety belts for motor vehicles, which have a locking system ahead of the braking device, comprising a bracket, a movable brake roller partly wrapped around by the belt rotatably supported in the bracket, means sufficient to retain said brake roller in position during normal operation but insufficient to prevent movement of said brake roller out of position when activated by a belt pull which exceeds a predetermined force, a stationary clamping bar disposed adjacent one side of the belt near said brake roller, a movable arresting element having one portion near said movable brake roller and another portion disposed on the side of the belt opposite the side on which said stationary clamping bar is disposed and wherein said arresting element is formed as a two-armed rocker arm, and is hingeably supported against a spring force, and wherein at one rocker arm disposed near said brake roller are arresting means for arresting the rotation of the brake roller when in contact therewith, and at the other arm of the rocker opposite the side of the belt on which clamping bar is disposed is a pressure pad which presses the belt onto the clamping bar whereby, upon activation of a belt pull in excess of said predetermined force, movement of said brake roller out of its normal position and against said arresting element which latter moves toward the stationary clamping bar to cause clamping of the belt and which also arrests the rotation of the brake roller by contact therewith.

11. Braking device for safety belts according to claim 10, wherein said arresting means at said rocker arm are arresting teeth.

12. Braking device for safety belts according to claim 10, wherein an intermediate part which can be pressed against the belt opposite the clamping bar by the arresting element, is disposed between the pressure pad of the arresting element and the clamping bar, and wherein said intermediate part has a freely rotatable ball which extends by spring force beyond the clamping surface of the intermediate part which is turned toward the clamping bar, and said ball can retract behind the clamping surface when the device is activated.

* * * * *